US012201575B2

(12) United States Patent
Sedic

(10) Patent No.: US 12,201,575 B2
(45) **Date of Patent: *Jan. 21, 2025**

(54) PERSONAL MASSAGER WITH UNDULATING ARM

(71) Applicant: LELO Inc., San Jose, CA (US)

(72) Inventor: Filip Sedic, Stockholm (SE)

(73) Assignee: LELO Inc., San Jose, CA (US)

( * ) Notice: Subject to any disclaimer, the term of this patent is extended or adjusted under 35 U.S.C. 154(b) by 853 days.

This patent is subject to a terminal disclaimer.

(21) Appl. No.: 17/354,006

(22) Filed: Jun. 22, 2021

(65) Prior Publication Data

US 2021/0308000 A1 Oct. 7, 2021

Related U.S. Application Data

(63) Continuation of application No. 16/434,486, filed on Jun. 7, 2019, now Pat. No. 11,071,681, which is a continuation of application No. 14/931,553, filed on Nov. 3, 2015, now Pat. No. 10,350,135.

(30) Foreign Application Priority Data

Nov. 3, 2014 (CN) ......................... 201410607417.4

(51) Int. Cl.
*A61H 19/00* (2006.01)
*A61H 23/02* (2006.01)

(52) U.S. Cl.
CPC ............. *A61H 19/34* (2013.01); *A61H 19/44* (2013.01); *A61H 23/0254* (2013.01); *A61H 23/0263* (2013.01); *A61H 2201/1215* (2013.01); *A61H 2201/1481* (2013.01)

(58) Field of Classification Search
None
See application file for complete search history.

(56) References Cited

U.S. PATENT DOCUMENTS

| | | | |
|---|---|---|---|
| 8,801,600 | B2 | 8/2014 | Zipper |
| 9,610,214 | B2 | 4/2017 | Zipper |
| 9,737,458 | B1 | 8/2017 | Olivares |
| 2014/0228628 | A1 | 8/2014 | De Alva |
| 2014/0350333 | A1 | 11/2014 | Stout |
| 2016/0000642 | A1 | 1/2016 | Zipper |
| 2016/0045392 | A1 | 2/2016 | Massey |
| 2018/0042809 | A1 | 2/2018 | Zipper |

*Primary Examiner* — LaToya M Louis
(74) *Attorney, Agent, or Firm* — Evan Feldstein

(57) ABSTRACT

A personal massage device includes a front end and a back end, and may also include a third end. A curved shaft is enclosed in both the front end and the back end. A sliding component is placed on one end of the curved shaft. The design of the curved shaft and sliding component enables the front end to bend toward and away from the back end. If included, the third end can be attached to the back end. The device further includes a motor enclosed in each end. The motors in the front and third ends are adapted for creating vibration at various frequencies and amplitudes, while the motor in the back end rotates the curved shaft to generate the bending motion. To enhance the massaging effect of the device, the device is capable of simultaneously bending and vibrating, and simultaneously stimulating different areas of the body.

20 Claims, 8 Drawing Sheets

PERSONAL MASSAGER WITH UNDULATING ARM

CROSS REFERENCE TO RELATED APPLICATION

This application is a continuation of U.S. patent application Ser. No. 16/434,486, filed Jun. 7, 2019, which is a continuation of U.S. patent application Ser. No. 14/931,553 filed on Nov. 3, 2015, and also claims priority to Chinese Patent Application No. 201410607417.4 filed on Nov. 3, 2014, each of which is hereby incorporated by reference in its entirety.

BACKGROUND

This disclosure generally relates to personal massage devices and more particularly to a personal massager with an undulating arm.

Personal massagers, also known as personal vibrators, come in a variety of configurations and perform a variety of functions, ranging from medical therapy to erotic stimulation. A personal massager typically provides its massaging effect through vibration of one end, and in some cases the end is designed for movement other than just vibration. However, the movement of these personal massagers is fairly limited and is not designed specifically to accommodate the different physiologies of many different users while stimulating more than one area of the body simultaneously and providing independent user control of the stimulation. In addition, many personal massagers have a short service life and need to be replaced after a relatively short time due to the design of the movement mechanisms.

SUMMARY

A personal massage device includes a front end, a back end, and a third end. The third end points toward the front end such that it generally forms a second part of the front end, and both the front end and third end can provide stimulation to different areas of the body (e.g., simultaneous stimulation to the G-spot and the clitoris). The back end can form a handle or control end of the massage device for use by the user to operate and manipulate the device. The front end and the third end have a substantially smooth and continuous surface. In many embodiments, the surface of the front and third ends is made of silicone. The front and third ends are designed to be in contact with a user's body and to provide various massaging effects. In a number of embodiments, the front end can vibrate and bend toward and away from the back end (or toward and away from the third end) in an undulating or wave like motion. The third end can vibrate and is bendable so that the space between the front end and the third end is adjustable to fit different body shapes. Vibration of the front and third ends is driven by motors enclosed therein. The front and third end can have multiple settings each of which can provide different types of movement and/or vibration in different patterns or at different speeds. In some embodiments, the user can independently control the movement and/or vibration of the front and third ends. Another embodiment of the personal massage device has an undulating front end and has a back end, but does not have a third end.

A structure comprising a curved shaft and a sliding component generates the bending motion of the front end. A gear motor is enclosed in the back end. One end of the gear motor is connected to the curved shaft, and the sliding component is attached to the curved shaft. The sliding component is positioned in a guide groove in the front end. When the gear motor is turned on, the curved shaft rotates and the sliding component rotates along the axis of the curved shaft. Due to the presence of the guide groove, the rotation of the sliding component causes the front end to bend toward and away from the back end. The front end can bend as a whole in a smooth and controlled manner such that it does not prematurely age the surface on the front end, thus increasing the service life of the massage device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Personal Massager with Front End, Back End, and Third End

Figure 1:
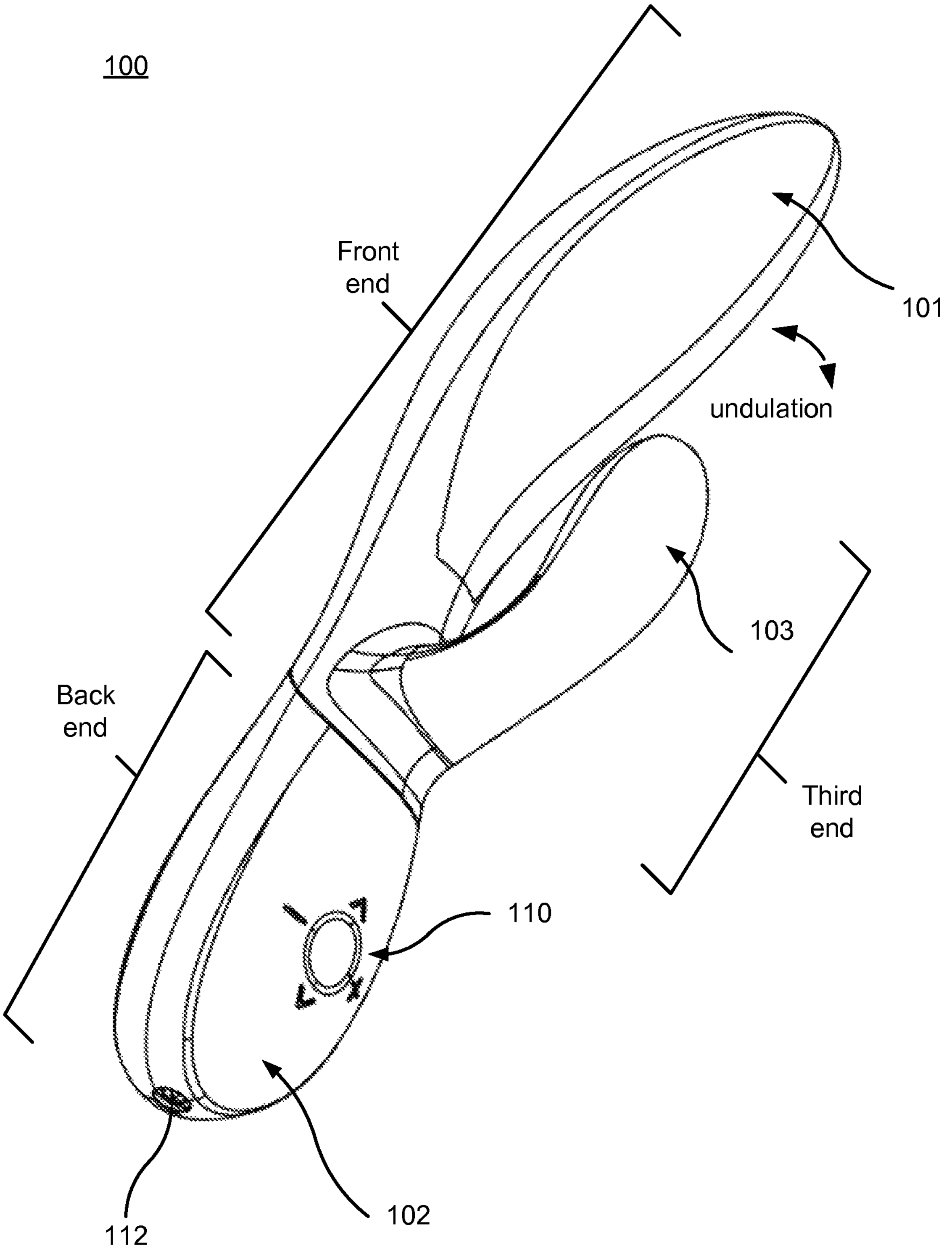
FIG. 1 is a perspective view of a personal massage device, according to one embodiment.

FIGS. 1-4 illustrate various views of a personal massage device 100, according to one embodiment. FIG. 1 is a perspective view of the personal massage device 100. The personal massage device 100 includes a front end 101, a back end 102 and a third end 103. In some embodiments, the front end 101, a portion of the back end 102, and the third end 103 are covered by a silicone surface while the rest of the back end 102 is covered by a plastic case. In other embodiments, the surfaces covering the personal massage device 100 are composed of other materials. In some embodiments, the silicone surface is glued to the front end 101, the portion of the back end 102 and the third end 103. The personal massage device 100 also includes control buttons 110 or user controls, and a charging port 112.

Figure 2A:
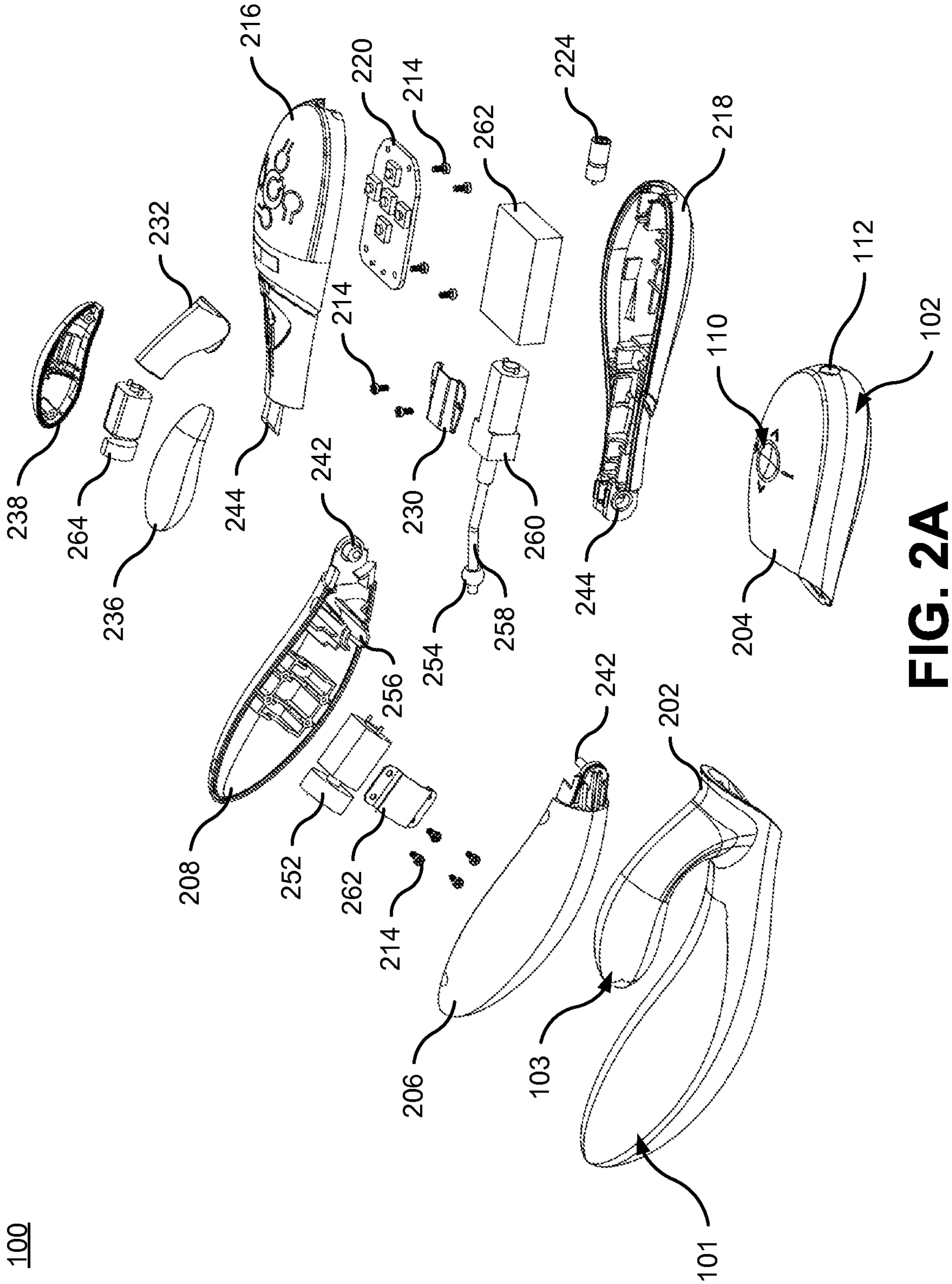
FIG. 2A is an exploded view of a personal massage device, according to one embodiment.
Figure 2B:
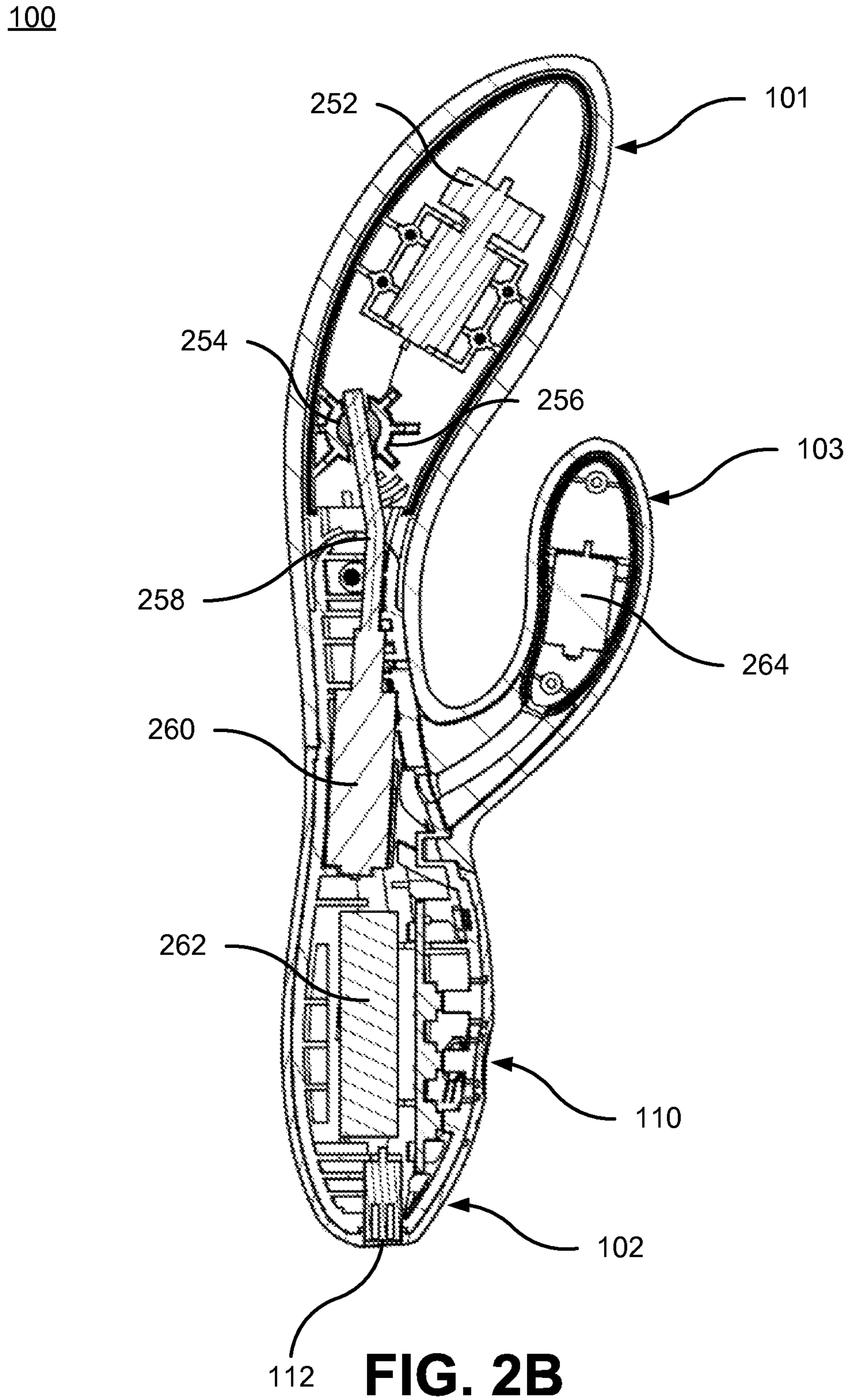
FIG. 2B is cross-sectional view of a personal massage device, according to one embodiment.

FIG. 2A is an exploded view of the personal massage device 100, and FIG. 2B is a cross-sectional view of the personal massage device 100, according to one embodiment. Because the exploded view in FIG. 2A illustrates many of the same components as the cross-sectional view in FIG. 2B, the description of FIGS. 2A and 2B is combined for ease of description.

As described above with reference to FIG. 1, a silicone surface 202 covers the front end 101, a portion of the back end 102, and the third end 103. The surface 202 will be referred to throughout as a silicone surface, though the surface could be composed of various different materials, such as rubber, plastic coated with a soft surface spray or other soft coating, or any other surface soft and pliable enough to massage the body. A plastic case 204 covers the rest of the back end 102. The case 204 will be referred to through as a plastic case, though the case could be composed of various different materials, such as various different polymers. The front end 101 includes a first front shell 206 and a second front shell 208. Together, the first front shell 206 and the second front shell 208 form a first housing. The back end 102 includes a first back shell 216 and a second back shell 218, which form a second housing. The third end 103 includes a third shell 236, a fourth shell 238 and a third housing formed by the two shells.

The front end 101 and the back end 102 are connected with a hinge, which includes bosses 242 at the end of the first front shell 206 and the second front shell 208 and corresponding holes 244 at the front of the first back shell 216 and the second back shell 218. The first front shell 206 and the second front shell 208 can be joined to each other by ultrasonic welding, ultrasonic splicing, or other methods. Similarly, the first back shell 216 and the second back shell 218 can be also joined to each other by ultrasonic welding, ultrasonic splicing, or other methods.

In some embodiments, the third end 103 is connected to the first back shell 216 with a mount 232. In one embodiment, the third end 103 is bendable so that the space between the front end 101 and third end 103 is adjustable. This adjustability allows the device to fit the body shapes of a wide range of users. In addition, the three-segment structure of the massage device 100 makes the manufacture of the massage device relatively simple and inexpensive.

A first motor 252 is enclosed in the first housing. In one embodiment, the first motor 252 is fixed to the second front shell 208 by a stator 262 and one or more fasteners 214. In one embodiment, the first motor 252 is a high-speed vibration motor that is capable of generating various vibration frequencies and amplitudes. In some embodiments, the first motor 252 is placed in the middle of the front end 101 so that the vibration is extended over the entire front end 101 and is evenly distributed on both sides of the first motor 252.

The third end 103 is capable of vibrating either simultaneously with or separately from the vibration of the front end 101. A third motor 264 is enclosed in the third housing. In some embodiments, the third motor 264 is fixed to the third shell 236 and fourth shell 238 by with adhesive or by splicing. In one embodiment, the third motor 264 is a high-speed vibration motor that is capable of generating various vibration frequencies and amplitudes. The massaging effect of the personal massage device 100 is enhanced when the third end 103 simultaneously vibrates with the front end 101.

The first motor 252 and the third motor 264 are powered by a battery 262 enclosed in the second housing. The battery 262 also provides power to a gear motor 260 enclosed in the second housing. In one embodiment, the gear motor 260 is fixed on the second back shell 218 by a stator 230 and one or more fasteners 214. In some embodiments, the battery 262 is rechargeable and connects to a charging connector 224 enclosed in the second housing. For example, the battery 262 can be a lithium battery, a NiMH battery, or some other type of rechargeable battery. The end of the charging connector 224 connects to the charging port 112.

In some embodiments, the second housing further encloses a curved shaft 258 connected to the gear motor 260. A sliding component 254 is placed on one end of the curved shaft 258 in a manner that allows the sliding component 254 to slide over the curved shaft 258. In some embodiments, the sliding component 254 sits between the hinge and the first motor 252. The sliding component 254 is placed in a guide grove 256 formed by two arc uplifts on the inside of the second front shell 208. The distance between the two arc uplifts of the guide groove 256 is large enough to enclose the sliding component 254. In some embodiments, the sliding component 254 is a sphere with a hole in the middle, and the curved shaft 208 is positioned through the hole. The sphere can be made of metal, ceramic, or some other material. In other embodiments, the sliding component 254 has a different shape, such as a cube or an ellipsoid.

The first motor 252 causes the front end 101 to vibrate when the first motor 252 is turned on. Similarly, the third motor 264 causes the third end 103 to vibrate when the third motor 264 is turned on.

When the gear motor 260 is turned on, the curved shaft 258 rotates and the sliding component 254 also rotates along the axis of the curved shaft 258. Due to the presence of the guide groove 256, the sliding component 254 pushes the front end 101 in a manner that causes the front end 101 to bend toward and away from the back end 102.

Figure 3:
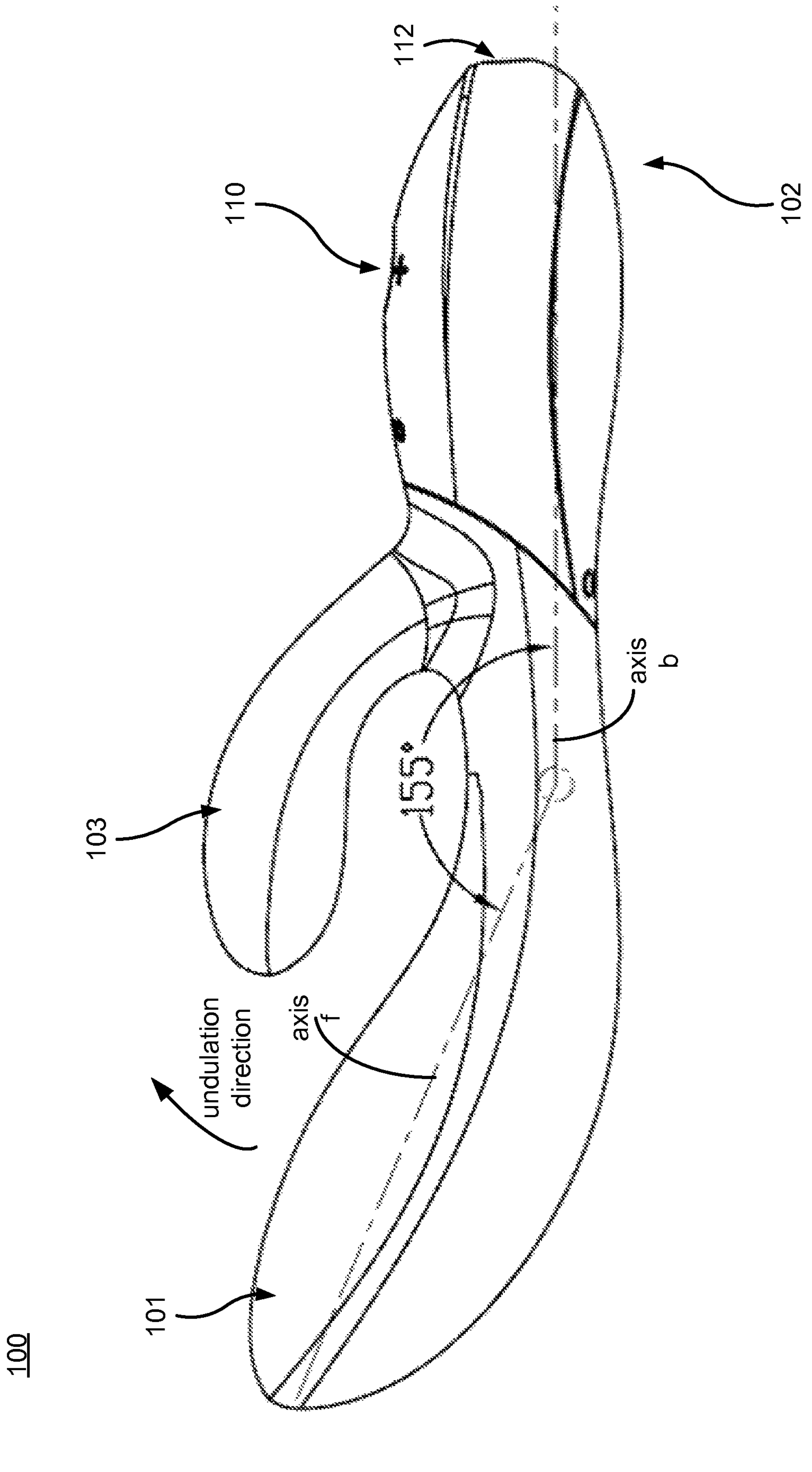
FIG. 3 is a side view of a personal massage device in a first position, according to one embodiment.
Figure 4:
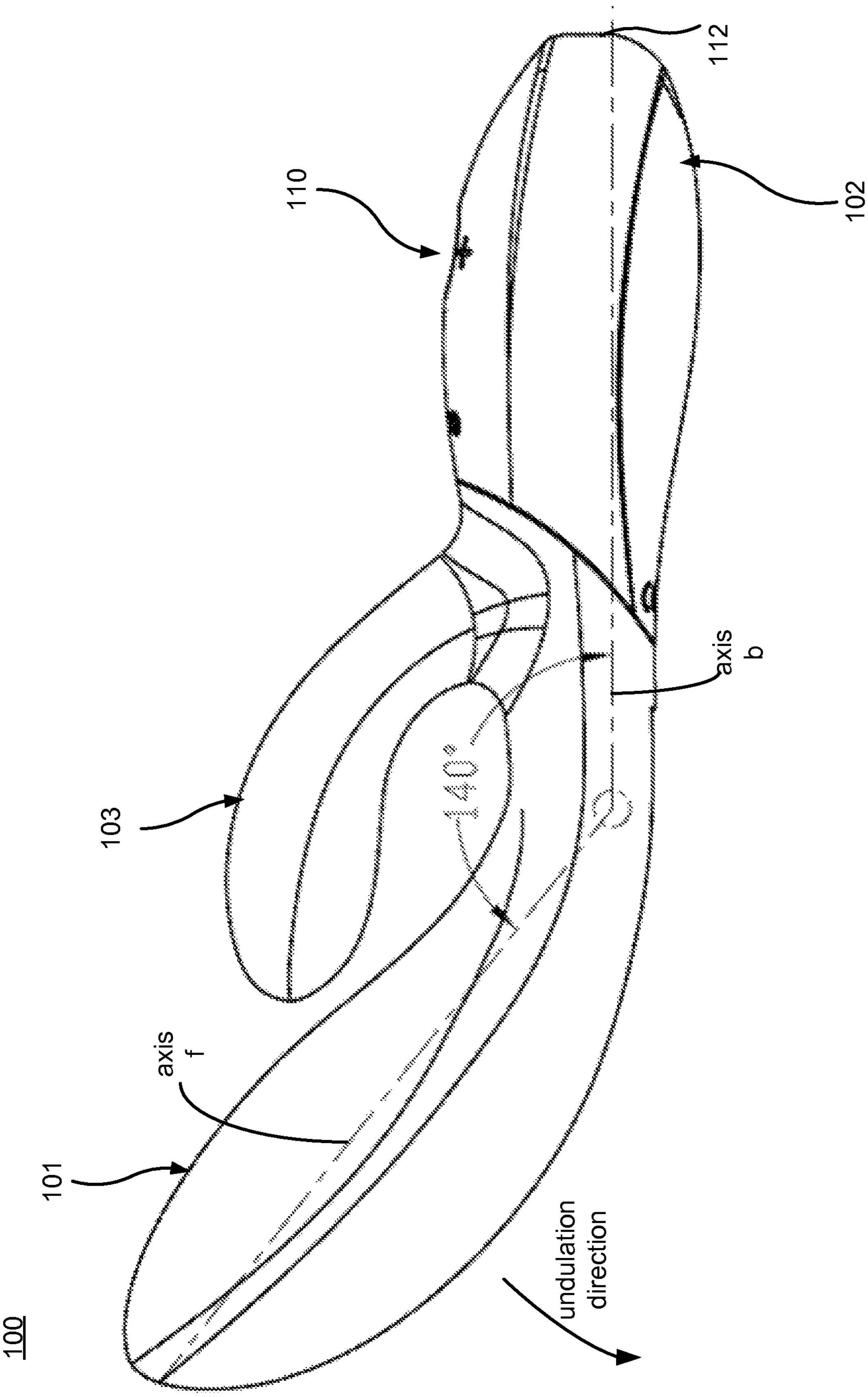
FIG. 4 is a side view of a personal massage device in a second position, according to one embodiment.

An example of the bending motion of the front end 101 is shown in FIGS. 3 and 4. FIGS. 3 and 4 show two different positions of the front end 101 relative to the back end 102. FIGS. 3 and 4 also show the axis of the front end 101 and the axis of the back end 102. Both axes intersect with the hinge. The rotation of the sliding component 254 causes the angle between the two axes to oscillate between the first position (shown in FIG. 3) and the second position (shown in FIG. 4), thus generating the bending motion. FIG. 4 after undulation in the direction shown by the arrow in the figure (e.g., toward the third end and back end). This undulation forward or upward as shown in FIG. 4 allows the front end to press against the G-spot. FIG. 3 illustrates the device after undulation backward or downward away from the G-spot in the direction shown by the arrow in the figure. The FIG. 3 position can be the resting position of the device. The device can oscillate between the position of FIG. 3 and of FIG. 4 to thus provide the undulating stimulation.

The design of the curved shaft 258 and the sliding component 254 generates a smooth bending motion. Also, because the front end 101 is bending as a whole, there is consistent movement over the silicone surface of the front end 101. Consequently, the portion of the silicone surface that covers the front end 101 is not mechanically aged when the front end bends, which increases the service life of the silicone surface. In some embodiments, the front end 101 is capable of simultaneously bending and vibrating (e.g., with the first motor 252 and the gear motor 260 turned on simultaneously) to enhance the massaging effect of the personal massage device 100.

Referring back to FIGS. 2A and 2B, the second housing further encloses a controller that controls the motors 252, 260, 264 in the massage device 100 based on control signals (e.g., button presses on the control buttons 110). For example, the controller may change the rotation the first motor 252 or the third motor 264 (e.g., to change the vibration frequency or amplitude at the first end 101 or the third end 103) in response to receiving a control signal. The controller may also change the rotation of the gear motor 260 (e.g., to adjust the speed of the bending motion) in response to receiving a control signal.

The control buttons 110 (also shown in FIG. 1) show a "+" and a "–" that can be used to increase or decrease speed of vibration and/or movement. The circular button in the middle can be used to power on and off the device or to cycle through settings. The up and down arrows can also be used to cycle through settings. In some embodiments, the portion of the circle in the center that is depressed controls whether the speed is changed or the setting is changed (e.g., depressing the circle toward the "+" sign increases speed while depressing the circle toward the up arrow moves to the next setting). In other embodiments, the "+" and "–," and the up and down arrows can be separate buttons themselves. Other designs are also possible for the controls, such as separate buttons to control each of the front and third ends, or separate buttons to control vibration versus undulation, or a user interface that allows the user to enter different specific settings.

In some embodiments, the controller includes an electrical circuit board 220. In one embodiment, the electrical circuit board 220 is fixed to the first back shell 216 with one or more fasteners 214. The battery 262, charging connector 224, first motor 252, gear motor 260 and third motor 254 are electrically connected to the circuit board 220.

In use, at least a portion of the front and third ends stimulate the body of the user, and the back end is manipulated by the user to control the device. The front end can be inserted into the vagina of the user to stimulate the G-spot. The undulating or oscillating motion of the front end mimics the action of the finger of a user moving back and forth and/or up and down to stimulate the G-spot. The third end rests against the clitoris of the user on the outside of the body to provide a second form of stimulation to the body. Since the third end is pliable, it can bend to mold to the outside of different body shapes while the front end is inside the body. Together, the front and third ends can thus simultaneously stimulate two different parts of the body. The front and third ends can also be used separately or independently, and do not have to be operated at the same time.

The massage device can also have a variety of settings that modify how each of the front and third ends responds to the user controls manipulated by the user. For example, the front end can both vibrate and undulate while the third end vibrates. As another example, the front end can undulate without vibration while the third end vibrates. As a further example, the front end can vibrate without undulation while the third end also vibrates. As an additional example, either the front end or the third end can remain stationary without vibration or undulation while the other of the front or third ends undulates and/or vibrates. In addition, both the front and third ends have a variety of different vibrate speeds and vibration patterns. They can operate at the same speed and pattern, or each end can operate with a different speed or pattern. Similarly the undulation of the front end can occur according to different speeds and patterns. For example, the front end can undulate slowly or rapidly, can undulate according to a particular beat, or can have shorter undulations such that the distance that it undulates is less than is shown between FIGS. 3 and 4. It can have a different starting position (e.g., the position of FIG. 4) such that it starts closer to the G-spot and performs more of a tapping motion rather than a full undulation. In all of these examples, the user can control the settings of the device to independently set the motion of the front and third ends. The user can decide whether to have the front end undulate or not and at what speed or pattern, whether to have the front end vibrate or not and at what speed or pattern, and whether to have the third pattern vibrate or not and at what speed or pattern. In some embodiments, the user rotates through a variety of settings such as a first setting with undulation and vibration in the first end plus vibration in the third end, then a second setting with vibration only in both ends, then a third setting with vibration only in the front end, and so forth. In other embodiments, the user has different controls for the front end versus the third end to control them independently in that manner.

In some embodiments, the third end also includes a movement mechanism similar to that within the front end such that the third end can also undulate or oscillate to stimulate the clitoris. The massage device can also have more than a front end and third end for stimulation. For example, the device can include a fourth end for stimulating the anus.

Personal Massager with Front End and Back End

Figure 5:
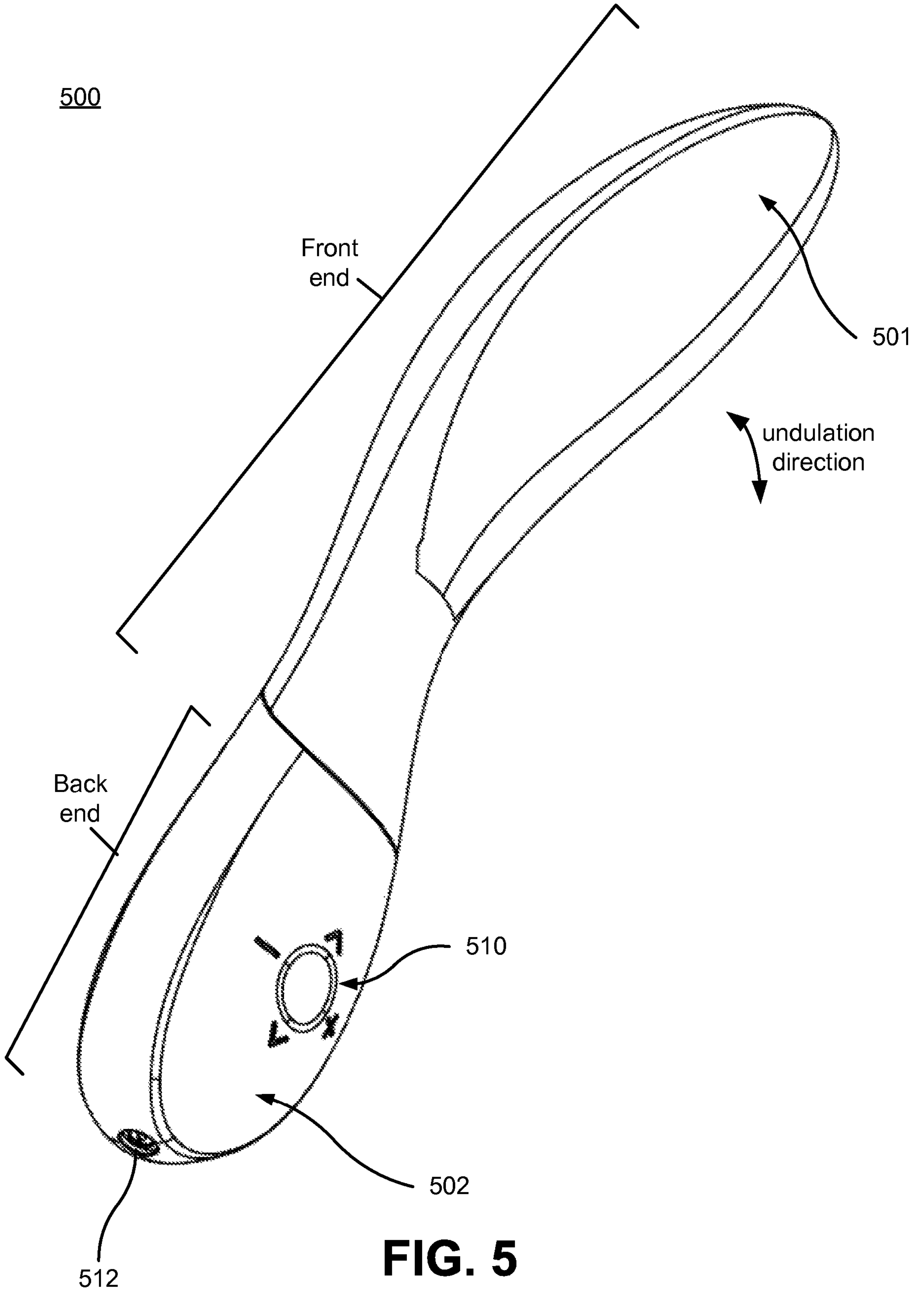
FIG. 5 is a perspective view of a personal massage device, according to another embodiment.
Figure 6:
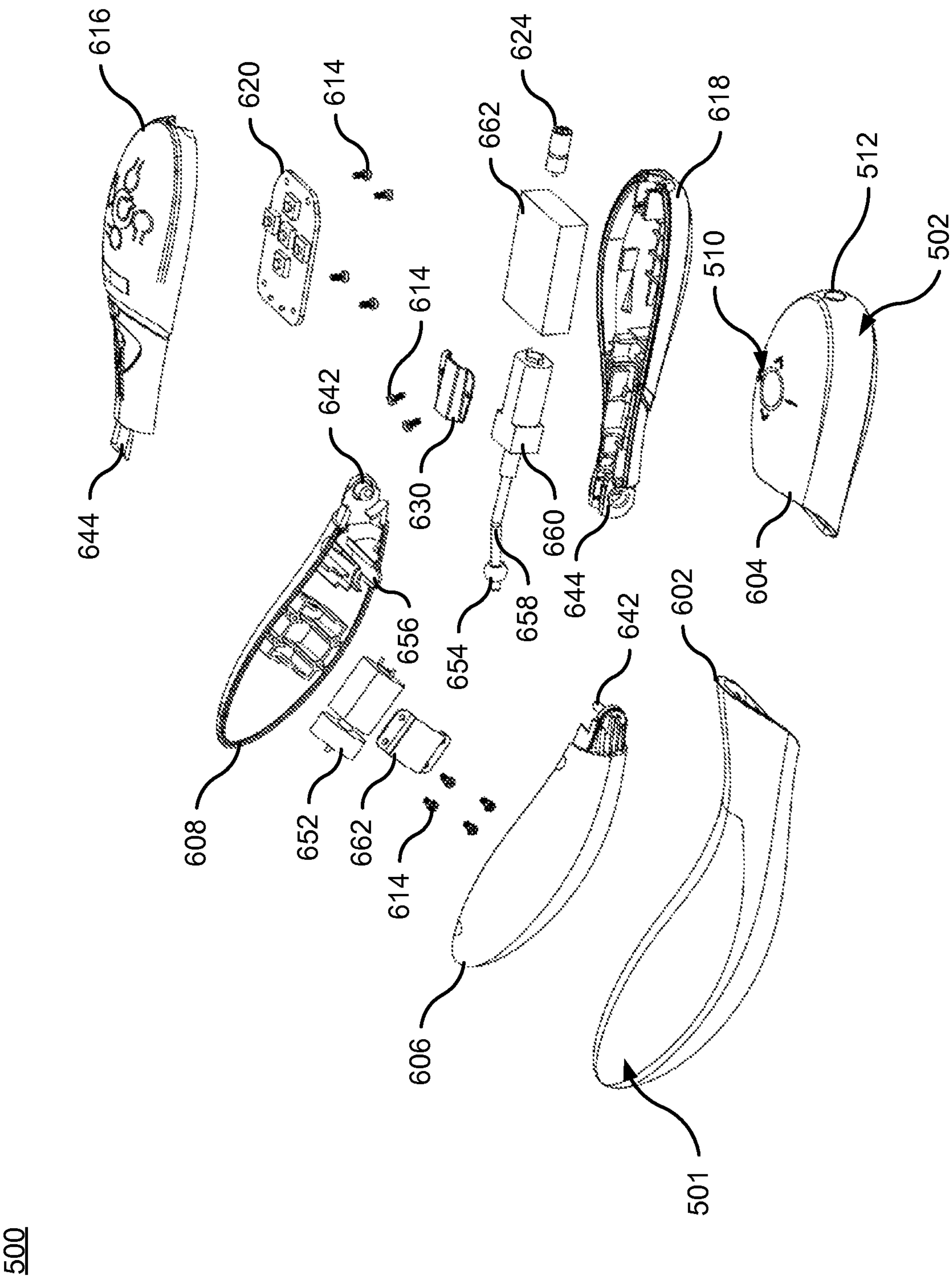
FIG. 6 is an exploded view of a personal massage device, according to another embodiment.

FIGS. 5-6 illustrate another embodiment of a personal massage device 500. FIG. 5 is a perspective view of the personal massage device 500. The personal massage device 500 includes a front end 501 and a back end 502 but does not include a third end. In some embodiments, the front end 501 and a portion of the back end 502 are covered by a silicone surface while the rest of the back end 502 is covered over by a plastic surface. In other embodiments, the surfaces covering the personal massage device 500 are made of other materials. In some embodiments, the silicone surface and the plastic surface are glued to the front end 501 and the back end 502, respectively. The personal massage device 500 also includes control buttons 510 and a charging port 512. The internal components are generally the same as shown in FIG. 2B.

FIG. 6 is an exploded view of the personal massage device 500. As described above with reference to FIG. 5, a silicone surface 602 covers the front end 501 and a portion of the back end 502. A plastic case 604 covers the rest of the back end 502. The front end 501 includes a first front shell 606 and a second front shell 608. Together, the first front shell 606 and the second front shell 608 form a first housing. The back end 502 includes a first back shell 616 and a second back shell 618, which form a second housing.

The front end 501 and the back end 502 are connected with a hinge, which includes bosses 642 at the end of the first front shell 606 and the second front shell 608 and corresponding holes 644 at the front of the first back shell 616 and the second back shell 618. The first front shell 606 and the second front shell 608 can be joined to each other by ultrasonic welding, ultrasonic splicing, or other methods. Similarly, the first back shell 616 and the second back shell 618 can also be joined by ultrasonic welding, ultrasonic splicing, or other methods.

A first motor 652 is enclosed in the first housing. In one embodiment, the first motor 652 is fixed to the second front shell 608 by a stator 662 and one or more fasteners 614. In one embodiment, the first motor 652 is a high-speed vibration motor that is capable of generating various vibration frequencies and amplitudes. In some embodiments, the first motor 652 is placed at the middle of the front end 501, so that the vibration is extended over the entire front end and is evenly distributed on both sides of the first motor 652.

The first motor 652 is powered by a battery 662 enclosed in the back end 502. The battery 662 also provides power to a gear motor 660 enclosed in the second housing. In one embodiment, the gear motor 660 is fixed on the second back shell 618 by a stator 630 and one or more fasteners 614. In some embodiments, the battery 662 is rechargeable and connects to a charging connector 664 enclosed in the second housing. For example, the battery can be a lithium battery, a NiMH battery, or some other type of rechargeable battery. The end of the charging connector 624 connects the charging port 512.

In some embodiments, the second housing further encloses a curved shaft 658 connected to one end of the gear motor 660. A sliding component 654 is placed on one end of the curved shaft 658 in a manner that allows the sliding component 654 to slide over the curved shaft 658. The sliding component 654 is placed in a guide grove 656 formed by two arc uplifts on inside of the second front shell 608. The distance between the two arc uplifts of the guide groove 656 is large enough to enclose the sliding component 254. In some embodiments, the sliding component 654 is a sphere with a hole in the middle, and the curved shaft 208 is positioned through the hole. The sphere can be made of metal, ceramic, or some other material. In other embodiments, the sliding component 654 has a different shape, such as a cube or ellipsoid.

The first motor 652 causes the front end 501 to vibrate when the first motor 652 is turned on. When the gear motor 626 is turned on, the curved shaft 658 rotates and the sliding component 654 also rotates along the axis of the curved shaft 658. Due to the presence of the guide groove 656, the sliding component 654 pushes the front end 501 in a manner that causes the front end to bend toward and away from the back end 502, similar to the motion described above for FIGS. 3 and 4. The front end can generally oscillate back and forth between positions similar to those of FIG. 3 and FIG. 4. In both Figures, the angle between the axis running generally through the center of the of the front end (shown as a dotted line, axis f) and the axis running generally through the center of the back end (shown as a dotted line, axis b) is greater than 90 degrees. In FIG. 3, the angle is shown as 155 degrees. In FIG. 4, after the front end had bent upward, the angle is reduced to 140 degrees. Different angles are also possible. For example, the FIG. 3 position could start with a greater angle and the FIG. 4 position could end with a smaller angle such that the oscillation between one position and the other is larger than a 15 degree change between an angle of 155 degrees to 140 degrees (e.g., a 20 or 25 degree angle change). Similarly, the opposite could be true such that the oscillation is less than the 15 degree angle change (e.g., a 5 or 10 degree angle change). In some embodiments, the user can control the change in angle to set it higher or lower according to the user's preferences. In the embodiments of FIGS. 3 and 4, the device only bends in one plane toward the back and third ends, and does not move side-to-side or horizontally relative to the third end. Such a design allows the device to focus on applying and removing focused pressure directly to the G-spot as opposed to other areas that would be stimulated if the device also moved from side-to-side.

The design of the curved shaft 658 and the sliding component 654 generates bending and vibration motions that are smooth and not jerky. Also, because the front end 501 is bending as a whole, there is consistent movement over the silicone surface 602 of the front end 501. Consequently, the silicone surface 602 is not mechanically aged when the personal massage device 500 is used, which increases the service life of the silicone surface 602. In some embodiments, the front end 501 is capable of simultaneously bending and vibrating (e.g., with the first motor 652 and the gear motor 660 turned on simultaneously) to enhance the massaging effect of the personal massage device 500. As described above for the embodiment that includes the third end, the user can control the settings of this embodiment, as well. For example, the user can have settings that the user rotates through with different patterns of undulation and different speeds of undulation, with different patterns of vibration and different speeds of vibration, with different combinations of undulation and vibration, and so forth. In other examples, the device can include separate controls for vibration versus undulation.

The second housing further encloses a controller that controls the motors 652, 660 in the massage device 500 based on control signals (e.g., button presses on the control buttons 510). For example, the controller may change the rotation the first motor 652 (i.e., to change the vibration frequency or amplitude at the first end 501) in response to receiving a control signal. The controller may also change the rotation of the gear motor 660 (i.e., to adjust the speed of the bending motion) in response to receiving a control signal.

In some embodiments, the controller is an electrical circuit board 620. In one embodiment, the electrical circuit board 620 is fixed to the first back shell 616 with one or more fasteners 614. The battery 662, charging connector 624, first motor 652, and gear motor 660 are electrically connected to the circuit board 620.

In use, this embodiment of the massage device operates in generally the same manner as described above for the embodiment of FIG. 1. It generally vibrates and undulates at the front end to stimulate the G-spot. However, it does not include a third end for stimulation of the clitoris.

Operation of Personal Massager

Figure 7:
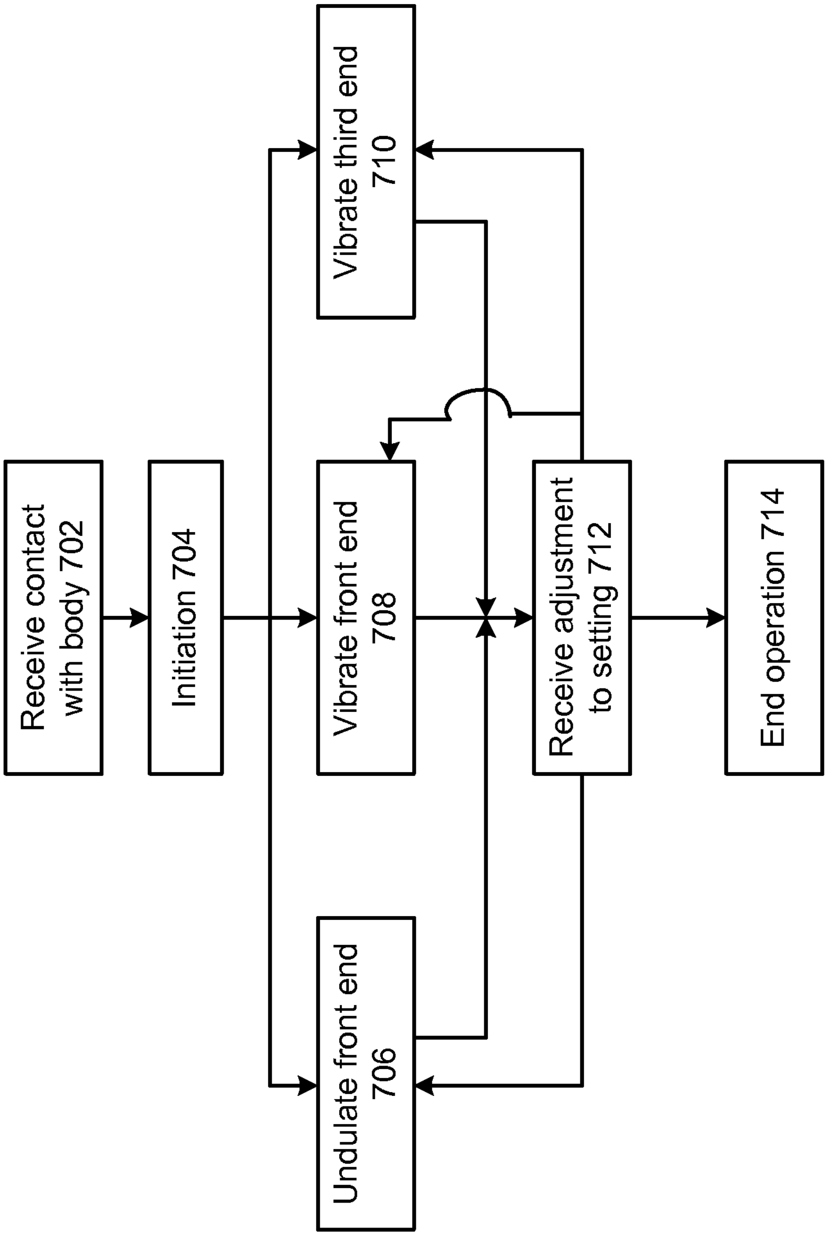
FIG. 7 is a flowchart illustrating operation of the personal massage device, according to an embodiment.

FIG. 7 illustrates one embodiment of the operation of a personal massage device, such as those shown in FIGS. 1-6. The method can include fewer, more, or different steps from those shown in FIG. 7. The method is described from the standpoint of the massage device. The massager comes into contact with or receives contact 702 with the body. For example, it may be inserted into the vagina and contact a portion of the vagina. Where the device has a third end, it may also contact an outside portion of vaginal area, such as the clitoris. The device is initiated 704 or started, or receives instructions to initiate. For example, a user may select a user control to power on the device (e.g., depress a button to turn on the device), which sends an instruction to a controller of the device to power on one or more motors in the device to begin stimulation of the user. It may be initiated before or after it contacts 702 the body.

The device begins operation. Depending on the setting, the device may receive instructions to undulate, vibrate, or both. For example, a controller in the device may receive instructions and may control one or more motors in the body to cause them to operate according to a current setting of the device, or according to an initial setting of the device, or according to a specific instruction provided by the user for the setting. The front and third ends may both be operated or only one may be operated. For example, the front end may undulate 706 back and forth or up and down within a vagina of a user. As another example, the front end may vibrate 708 within a vagina of a user. Both of steps 706 and 708 may stimulate a G-spot of the user or otherwise stimulate the vagina, such as the vaginal opening or internal surface of the vagina. As a further example, the third end may vibrate 710 outside the vagina of the user for stimulation of the clitoris. Where the device has no third end, the step 710 may not occur.

The user can further manipulate the controls such that the device receives adjustment 712 of the settings or receives instructions at a controller to change the settings. For example, the user can depress a button that changes the setting (e.g., cycles from a first setting to a second setting, or instructs the device regarding a particular setting to apply). The settings can be changed such that the device uses any of steps 706, 708 and 710 independently and/or simultaneously. The controller can receive instructions according to the user controls and can operate one or more motors of the device. For example, the front end of the device might be undulating 706 and vibrating 708, and the adjustment 712 can activate the third end of the device that was previously not moving or vibrating to begin vibration 710. As another example, the front and third ends may be vibrating 708, 710, and the adjustment 712 causes the front end to also begin undulating while simultaneously causing the frequency of vibration of the third end to increase and/or change in vibration pattern.

The device can continue to operate until it is powered off or removed from the body to end 714 operation. At this point all vibration 708, 710, and undulation 706 may stop.

CONCLUSORY STATEMENTS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

All dimensions, materials, and specific numbers shown in the embodiments are given only by way of example, in order to aid the understanding of the invention; none of them are meant to limit the present invention, unless it is explicitly stated so.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A personal massage device, comprising:

a housing;

a first motor disposed within said personal massage device;

a bending arm disposed within said personal massage device, the bending arm comprising a sliding component capable of moving along a guide groove in said personal massage device; and a controller configured to control operation of a gear motor connected to the bending arm.

2. The device of claim 1, wherein the housing is comprised of a first shell and a second shell.

3. The device of claim 2, wherein at least a portion of said personal massage device is covered with a silicone case.

4. A personal massage device, comprising:

a housing having a front end, a back end substantially opposite the front end, and a third end;

a first motor disposed adjacent said front end;

a second motor disposed adjacent said third end;

a bending arm connected to the second motor and disposed within said personal massage device, the bending arm comprising a sliding component capable of moving along a guide groove in said personal massage device, and the bending arm configured to drive the front end to bend toward and away from the back end; and a controller configured to control operation of the first motor and the second motor.

5. The device of claim 4, wherein the sliding component is a ball capable of sliding over the bending arm.

6. The device of claim 5, wherein the front end is covered with a silicone case.

7. The device of claim 4, wherein the angle between the axis of the front end and the axis of the back end is greater than 90 degrees.

8. The device of claim 4, further comprising a battery disposed within said personal massage device.

9. The device of claim 8, wherein the battery is rechargeable and connectable to a charging port, and wherein the controller comprises an electronic board.

10. The device of claim 4, wherein the first motor is a vibration motor.

11. The device of claim 10, wherein the second motor is a gear motor.

12. The device of claim 11, further comprising one or more user controls on the back end, the user controls configured to allow a user to switch between different settings of the device in which the first motor provides vibration to the front end, and the second motor provides bending of the front end toward and away from the back end.

13. The device of claim 12, wherein the first motor is configured to be controlled independently from the second motor such that the settings include both vibration of the front end and bending of the front end toward and away from the back end, or only bending of the front end toward and away from the back end without vibration, or only vibration of the front end without the bending.

14. The device of claim 4, wherein a tip of the third end is disposed nearer to the front end than to the back end.

15. A personal massage device, comprising:

a housing having a front end, a back end substantially opposite the front end, and a third end;

a first motor disposed adjacent said first end;

a second motor disposed adjacent said third end;

a bending arm connected to the second motor and disposed within said personal massage device, the bending arm comprising a sliding component capable of moving along a guide groove in said personal massage device, and the bending arm configured to drive the front end to bend toward and away from the back end; and a controller configured to control operation of the first motor and the second motor independently from one another.

16. The device of claim 15, wherein the first motor is a vibration motor and the second motor is a gear motor.

17. The device of claim 16, further comprising a battery disposed within said personal massage device.

18. The device of claim 17, wherein the battery is rechargeable and connectable to a charging port, and wherein the controller comprises an electronic board.

19. The device of claim 18, further comprising one or more user controls on the back end, the user controls configured to allow a user to switch between different settings of the device.

20. The device of claim 19, wherein a tip of the third end is disposed nearer to the front end than to the back end.

* * * * *